United States Patent [19]
Aulisa

[11] 3,746,370
[45] July 17, 1973

[54] SEALING DEVICE FOR NIPPLES
[75] Inventor: Gerard D. Aulisa, Claymont, Del.
[73] Assignee: Sun Oil Company, Philadelphia, Pa.
[22] Filed: June 1, 1972
[21] Appl. No.: 263,371

[52] U.S. Cl. .................... 285/15, 138/99, 285/197
[51] Int. Cl. .......................................... F16l 55/16
[58] Field of Search ................ 285/15, 16, 17, 197,
285/171, 337; 138/99; 29/401, 402; 137/318,
15; 251/145, 146

[56] References Cited
UNITED STATES PATENTS
| | | | |
|---|---|---|---|
| 646,011 | 3/1900 | Sterling | 285/337 |
| 608,613 | 8/1898 | Linich | 285/337 |
| 3,480,252 | 11/1969 | Simons | 251/146 |
| 2,689,142 | 9/1954 | Glayzer | 138/99 X |
| 3,687,490 | 8/1972 | Dunmire | 285/197 |
| 1,178,234 | 4/1916 | Hayden | 285/199 |
| 3,480,036 | 11/1969 | Ehrens et al. | 285/198 X |

Primary Examiner—Thomas F. Callaghan
Attorney—George L. Church, Donald R. Johnson et al.

[57] ABSTRACT

A device for sealing leaks around pressure-tap nipples in a main pipeline without removing the line from service, comprising a split saddle having a bushing surrounding the nipple and clamped to the pipe by means of a band surrounding the pipe and overlying the saddle. Packing is inserted between the bushing and the nipple, and this packing is compressed into a sealing position by means of a split packing gland which surrounds the nipple and is drawn down onto the packing by means of upstanding studs secured to the saddle and passing through the packing gland.

1 Claim, 3 Drawing Figures

SEALING DEVICE FOR NIPPLES

This invention relates to a sealing device for pipe nipples, and more particularly to a device for sealing leaks around pressure-tap nipples which are welded into flanges in a main pipeline.

In order to measure certain pressures in a main pipeline, such as the pressures developed adjacent calibrated orifices mounted in a pipeline, pipe nipples serving as pressure taps, of small diameter compared to that of the main line, are welded into flanges provided in the main line, these pipe nipples extending in a generally radial direction with respect to the main line, the inner ends of the nipples being coupled to the interior of the main line and the outer ends of the nipples being coupled to suitable pressure transducers.

Occasionally, a leak develops around the outside of these nipples, which results in a safety hazard as well as an economic loss (due to loss of valuable hydrocarbon product from the main line). According to prior practice, it was necessary to remove the main line from service (which meant shutting down the entire process unit, of which the main line forms a part) in order to repair the leak. Such a shutdown is both costly and time-consuming.

An object of this invention is to provide a novel sealing device for nipples.

Another object is to provide an improved sealing device for pressure-tap pipe nipples.

A further object is to provide a leak-sealing device for pressure-tap pipe nipples which can be installed (applied) without removing the main pipeline from service.

A still further object is to provide a novel leak-sealing device for nipples which is efficient and effective in operation.

The manner in which the foregoing objects are accomplished will be best understood from the following detailed description of the invention, taken in conjunction with the accompanying drawing, wherein.

Figure 1:
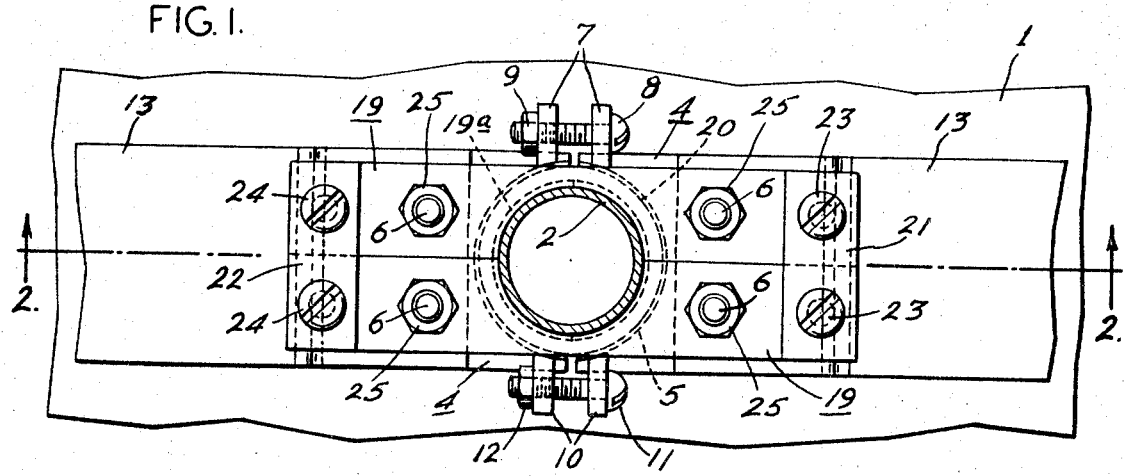
FIG. 1 is a plan view of the nipple sealing device of this invention, as assembled or installed.
Figure 2:
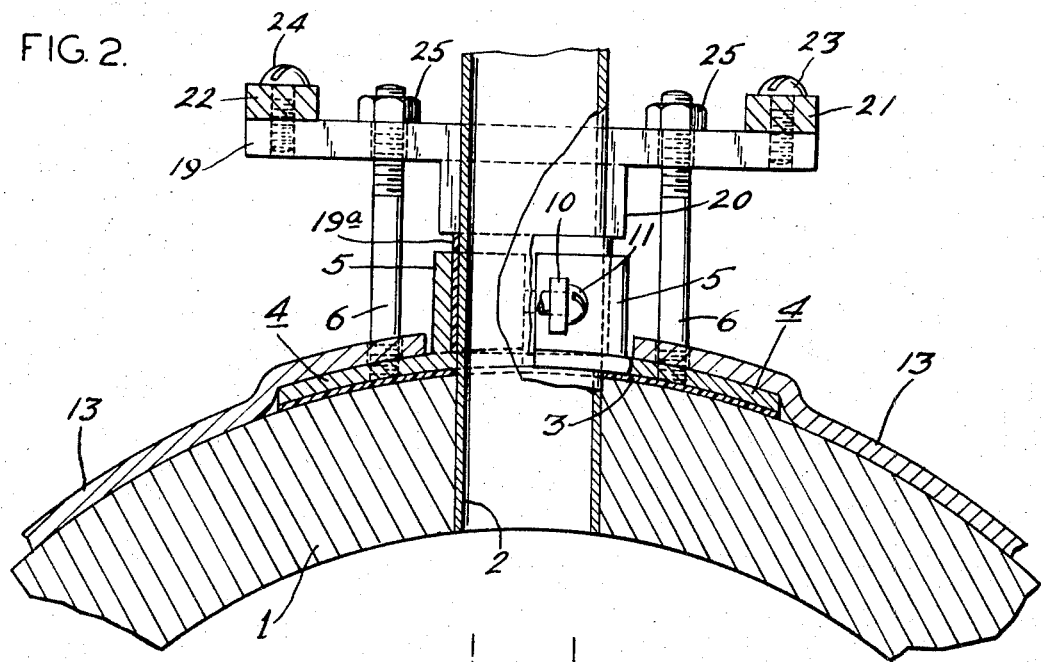
FIG. 2 is a cross-section taken along line 2—2 of FIG. 1.

Now referring to the drawings, the numeral 1 denotes a portion of the wall of a flanged main pipeline, the pipeline and the falnge being illustrated as a single, integral member for the sake of convenience. A pipe nipple 2, whose diameter is small compared to that of the main pipeline bore, serves as a pressure tap for the main line. Nipple 2 is welded entirely through the flange and also through the wall of the main line itself, such that the inner end of the nipple communicates with the bore or interior of the main line; the axis of nipple 2 extends in a radial direction (i.e., radial with respect to the main pipeline) through the flange and pipeline wall. Assuming that nipple 2 is serving as an (orifice) pressure tap, the outer end of this nipple (not shown) would be coupled to a suitable pressure transducer.

Occasionally, leaks develop around the outside of the nipple 2, in the area of the weldment; such leaks permit fluid to escape from the main pipeline into the atmosphere. The purpose of the device of this invention is to seal such a leak. The sealing device of the invention is applied or installed while the main line is in service, that is, without shutting off the flow of fluid through this line.

When a leak develops around the orifice pressure-tap 2, a gasket 3, having a central aperture for nipple 2, is positioned around the nipple 2, against the outer surface of flange 1; this gasket is made of a suitable resilient sealing material and should be of split or multi-piece construction, so that it can be placed in position around the cylindrical outer wall of nipple 2.

A two-piece (or split) saddle member, denoted generally by numeral 4, is mounted in position overlying gasket 3; how this member is mounted will be described hereinafter. The member 4, which is split into two halves transversely of its length after it is completely fabricated, comprises a centrally-apertured (to surround nipple 2) bottom plate or pad about 3-½ inches in length curved to form a portion of a cylindrical surface whose curvature matches that of the outer surface of flange 1. At the central aperture in the bottom plate, and concentric therewith, member 4 has an integral (actually, it may be welded to the bottom plate) upstanding bushing 5, about ¾ inch long and with an I. D. of 1-1/16 inches, such as to loosely surround nipple 2. Saddle 4 has secured thereto four upstanding threaded studs 6, each about 1-½ inches long, each stud being threaded into the bottom pad of saddle 4 and then tack welded in position. The studs 6 are preferably symmetrically located with respect to the center line of saddle bushing 5, two being located on one side of the longitudinal center line of the composite saddle 4 and on respective opposite sides of bushing 5, and the other two being located on the other side of the longitudinal center line of the composite saddle and on respective opposite sides of bushing 5.

In order to secure the two halves of saddle 4 together after this member has been positioned as described, two pairs of outstanding aligned ears are formed on this member, with one ear of each pair integral with (or welded to) a respective half of the member, at a suitable location along the bushing 5. Ear pair 7 is located approximately centrally with respect to one of the longer sides of the rectangular pad of member 4, and this ear pair has aligned clearance holes through which extends a bolt 8 which has a nut 9 threaded thereon for tightly fastening together the two ears of the pair 7, and thus also the two halves of saddle member 4, at one side of the latter. Ear pair 10 is located approximately centrally with respect to the other of the longer sides of the rectangular pad of member 4, and this ear pair has aligned clearance holes through which extends a bolt 11 which has a nut 12 threaded thereon for tightly fastening together the two ears of the pair 10, and thus also the two halves of saddle member 4, at the other side of the latter.

The composite or two-piece saddle member 4 is held in position by means of a two-piece belly band 13 made of ⅛-inch steel strap, for example. The juxtaposed upper (in FIGS. 1 and 3) ends of the two pieces of band 13 are spaced about 1-½ inches apart, enough to clear the O. D. of saddle bushing 5, and these two upper ends overlie the pad of member 4. The upper ends of the two pieces of belly band 13 are provided with clearance holes for studs 6, in order to attach the upper ends of these two band pieces to saddle member 4. Thus, referring to FIG. 3, one belly band piece (the right-hand piece in FIG. 3) has two stud clearance holes centered on the aligned center lines 14 one of which is shown, at the right-hand side of bushing 5. The other belly band piece (the left-hand piece in FIG. 3) has two stud clearance holes centered on the aligned center lines 15 one of which is shown, at the left-hand side of bushing 5.

Figure 3:
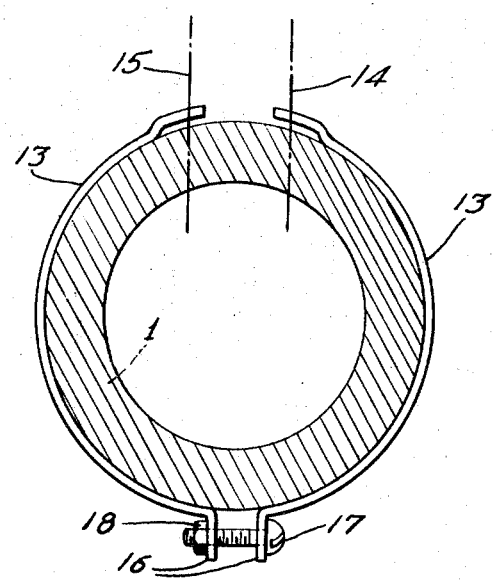
FIG. 3 is a somewhat diagrammatic sectional view illustrating the configuration of the belly band.

The belly band 13 pieces pass around the outside of flange 1 (the two pieces passing around the flange in relatively opposite directions, as illustrated in FIG. 3), and at the opposite side of this flange (approximately diametrically opposite to nipple 2) each piece of the band has an outstanding ear, the two ears being aligned to provide a pair 16. The ear pair 16 has aligned clearance holes through which extends a bolt 17 which has a nut 18 threaded thereon for tightly fastening the belly band 13 around the flange 1, and thus for tightly clamping the saddle member 4 in position on flange 1.

When the parts mentioned have been mounted as previously described, and the various nuts 9, 12, and 18 have all been tightened sufficiently, Teflon packing material 19a is inserted in the (narrow) annular space between the outside of nipple 2 and the inner face of saddle bushing 5. The packing material 19a should be of split or multi-piece construction, so that it can be placed in position around the cylindrical outer wall of nipple 2. In order to hold the packing material 19a in place, and to compress it to stop the leak, a two-piece (or split) packing gland, denoted generally by numeral 19, is utilized. The gland 19, which is split into two halves longitudinally of its length after it is completely fabricated, comprises a centrally-apertured (to closely surround nipple 2) base plate about four inches in length and, at its center and aligned with the aperture, an integral (or welded) downwardly-extending cylindrical shell 20 (I. D. 0.860 inch, and about ⅝ inch long) adapted to closely surround nipple 2 and to bear at its lower end against the upper end of packing 19a.

In order to secure the two halves of gland 19 together after it has been positioned around nipple 2, above packing 19a and saddle bushing 5, two tie bars 21 and 22, one at each respective opposite end of the composite gland 19, are employed. Tie bar 21, of rectangular cross-section, spans the joint between the two halves of gland 19 at one end thereof; two screws 23 pass through clearance holes in tie bar 21 and thread into aligned tapped holes provided in the two respective halves of gland 19. Tie bar 22, of rectangular cross-section, spans the joint between the two halves of gland 19 at the other end thereof; two screws 24 pass through clearance holes in tie bar 22 and thread into aligned tapped holes provided in the two respective halves of gland 19.

The base plate portion of gland 19 has four clearance holes, arranged to accommodate therein the respective studs 6; nuts 25 are threaded onto the upper ends of these studs, above gland 19. Nuts 25 are tightened to draw the gland shell 20 down onto packing 19a, to thereby compress the latter into sealing position around nipple 2 and against saddle bushing 5.

It is pointed out that the nipple sealing device of the present invention is intended to be applied or installed without removing the main line from service, which is to say while the leak around the nipple is leaking. The split or two-piece construction of the various members such as 4, 19, etc. enables this to be accomplished with ease.

The invention claimed is:

1. A sealing device for a nipple which extends outwardly through a pipe flange, comprising a saddle member having a pad portion adapted to overlie the outside of said flange and also having a cylindrical bushing adapted to surround said nipple, said saddle member being split into two halves; means for detachably securing together the two halves of said saddle member, thereby to form in effect a unitary member; a split gasket positioned between the outside of said flange and said saddle pad portion, surrounding said nipple, packing means positioned between the inner wall of said bushing and the outside of said nipple, a packing gland having a portion closely surrounding said nipple, said gland portion being movable to engage said packing means and to cause it to provide a seal in the annular space between said bushing and the outside of said nipple, said packing gland being split into two halves; means for detachably securing together the two halves of said packing gland, thereby to form in effect a unitary gland; threaded elements coupling said packing gland to said saddle pad portion, thereby to enable said gland portion to be moved into seal-providing engagement with said packing means; two separate aligned arcuate members extending circumferentially around said flange, in tight engagement with the outer surface thereof, one end of each of said last-mentioned members engaging respective threaded elements on said saddle pad portion; and means fastening together the other ends of the two last-mentioned members.

* * * * *